(12) United States Patent
Huffman et al.

(10) Patent No.: US 8,121,442 B2
(45) Date of Patent: Feb. 21, 2012

(54) OPTICAL FIBER SURVEILLANCE TOPOLOGY

(75) Inventors: John Sinclair Huffman, Conyers, GA (US); James Francis Kirkpatrick, Conyers, GA (US); Gerald F. Laszakovits, San Antonio, TX (US)

(73) Assignee: AT&T intellectual Property I, L.P., Atlanta, GA (US)

( * ) Notice: Subject to any disclaimer, the term of this patent is extended or adjusted under 35 U.S.C. 154(b) by 197 days.

(21) Appl. No.: 12/343,880

(22) Filed: Dec. 24, 2008

(65) Prior Publication Data

US 2010/0158431 A1    Jun. 24, 2010

(51) Int. Cl.
 *G02B 6/00* (2006.01)
(52) U.S. Cl. .................. 385/13; 385/12; 250/227.14
(58) Field of Classification Search .................. None
 See application file for complete search history.

(56) References Cited

U.S. PATENT DOCUMENTS

| | | | |
|---|---|---|---|
| 4,477,725 A | 10/1984 | Asawa et al. | |
| 4,781,056 A * | 11/1988 | Noel et al. | 73/800 |
| 4,812,645 A * | 3/1989 | Griffiths | 250/227.14 |
| 4,931,771 A * | 6/1990 | Kahn | 340/556 |
| 5,015,842 A * | 5/1991 | Fradenburgh et al. | 250/227.15 |
| 5,194,847 A | 3/1993 | Taylor et al. | |
| 5,330,136 A * | 7/1994 | Colbaugh | 246/122 R |
| 5,363,463 A * | 11/1994 | Kleinerman | 385/123 |
| 5,778,114 A | 7/1998 | Eslambolchi et al. | |
| 6,449,400 B1 | 9/2002 | Watanabe et al. | |
| 7,136,156 B1 | 11/2006 | Quint | |
| 7,488,929 B2 * | 2/2009 | Townley-Smith et al. | 250/227.14 |
| 2003/0198425 A1 * | 10/2003 | Tapanes et al. | 385/12 |
| 2005/0147340 A1 * | 7/2005 | Tapanes | 385/12 |
| 2008/0088846 A1 | 4/2008 | Hayward et al. | |
| 2008/0144016 A1 | 6/2008 | Lewis et al. | |
| 2009/0014634 A1 * | 1/2009 | Sikora et al. | 250/227.14 |
| 2010/0166357 A1 * | 7/2010 | Huffman et al. | 385/12 |

* cited by examiner

*Primary Examiner* — Mike Stahl

(57) ABSTRACT

In accordance with an aspect of the disclosed technology, a fiber surveillance system includes a single optical fiber, used, for example, in the detection of acoustic signals associated with vibrations or other activity. In one embodiment of the disclosed technology, the fiber is arranged in a two dimensional topology to improve the spatial resolution of the system. With such a topology the spatial monitoring resolution of the surveillance system is significantly improved over systems in which the fiber is deployed in an essentially straight line topology. In a further embodiment of the disclosed technology, two or more such oriented fibers are juxtaposed or overlapped to yield even greater resolution.

18 Claims, 6 Drawing Sheets

OPTICAL FIBER SURVEILLANCE TOPOLOGY

FIELD

The disclosed technology relates generally to optical fiber surveillance systems and methods.

BACKGROUND

U.S. Pat. No. 5,194,847 discloses "an apparatus for sensing intrusion into a predefined perimeter comprising means for producing a coherent pulsed light, which is injected into an optical sensing fiber having a first predetermined length and positioned along the predefined perimeter. A backscattered light in response to receiving the coherent light pulses is produced and coupled into an optical receiving fiber. The backscattered light is detected by a photodetector and a signal indicative of the backscattered light is produced. An intrusion is detectable from the produced signal as indicated by a change in the backscattered light. To increase the sensitivity of the apparatus, a reference fiber and an interferometer may also be employed."

U.S. Pat. No. 5,778,114 discloses a fiber analysis system that "detects threats to a buried underground fiber by delivering two optical sub-signals, split from a single beam, into opposite ends of the fiber so the sub-signals traverse the fiber in opposite directions. The sub-signals are recombined into a beam whose characteristics are detected by a detector. The output signal of the detector is compared by a processor to different reference values stored in a data base representing different detector output signals corresponding to different fiber conditions. By matching the detector output signal to a reference value associated with a particular fiber condition, the processor can determine whether a potential threat exists. By inducing a sequence of known vibrations (tones) in the fiber at spaced locations along a generally orthogonal to the fiber, the processor can establish the location of the fiber by comparing the detector output signal to a reference signals corresponding to the known tones to determine which one was received in the shortest time U.S. Patent Application Publication 20080088846 discloses an improved technique for acoustic sensing that involves, in one embodiment, "launching into a medium, a plurality of groups of pulse-modulated electromagnetic-waves. The frequency of electromagnetic waves in a pulse within a group differs from the frequency of the electromagnetic waves in another pulse within the group. The energy scattered by the medium is detected and, in one embodiment, may be used to determine a characteristic of the environment of the medium. For example, if the medium is a buried optical fiber into which light pulses have been launched in accordance with the invention, the presence of acoustic waves within the region of the buried fiber can be detected."

U.S. Patent Application Publication 20080144016 discloses an improved technique for acoustic sensing that in one embodiment, involves "launching into a medium, a plurality of groups of pulse-modulated electromagnetic-waves. The frequency of electromagnetic waves in a pulse within a group differs from the frequency of the electromagnetic waves in another pulse within the group. The energy scattered by the medium is detected and, in one embodiment, the beat signal may be used to determine a characteristic of the environment of the medium. For example, if the medium is a buried optical fiber into which light pulses have been launched in accordance with the invention, the presence of acoustic waves within the region of the buried fiber can be detected."

U.S. Pat. No. 4,477,725 discloses a system for remote measurement of structural forces that "includes a plurality of microbend transducers mounted along the length of the structure for microbending an optical fiber in response to structural forces, such as stress acting upon an oil or gas pipeline or the like. An optical time domain reflectometer (OTDR) has a light source for launching a pulsed optical signal for passage through the fiber and a photodetector for sensing as a function of time the intensity of backscattered light reflected back through the fiber, wherein this sensed time function is correlated directly with discrete longitudinal positions along the length of the fiber and the structure. When one or more of the microbend transducers is activated to induce a microbend in the fiber in response to localized forces acting upon the structure, a portion of the backscattered light is lost at the microbend. This attenuation in backscattered light intensity is sensed quantitatively and positionally identified by the photodetector."

U.S. Pat. No. 6,449,400 discloses that "a sensing optical fiber can detect information with a high detection sensitivity by an OTDR method using Rayleigh scattered light. For this purpose, the sensing optical fiber includes a main line element which is an optical fiber installed as a light transmission line and sensor elements which are relatively short optical fibers that are inserted in intermediate parts of the main line element and whose core diameters are different from that of the main line element. The sensor system is capable of detecting various types of information obtained simultaneously with a high detection sensitivity by an OTDR method using Rayleigh scattered light. For this purpose, a sensor system includes sensing optical fibers and a measuring instrument which detects information around the light transmission line, in which the sensing optical fibers are provided, by using backscattered light of the sensing optical fibers. In the sensor system, a plurality of the sensing optical fibers are provided, and the sensing optical fibers have a different number of the sensor elements, different distances between the sensor elements and different sensor element core diameters. Also, an optical switch, by which the sensing optical fibers are selectively switched, is provided between the sensing optical fibers and the measuring instrument." The system "can be applied for the following purposes (1) Detection of distortion, fatigue, rupture or the like in structures such as general buildings, high-rise buildings, speedways, elevated bridges, tunnels, dams, flying fields, harbor facilities, and industrial facilities. (2) Detection of distortion, fatigue, rupture or the like in moving structures such as frames of airplanes, ship hulls, frames of motorcars, frames of railroad vehicles, and spacecraft bodies. (3) Detection of distortion, fatigue, rupture or the like in general building materials such as steel frames, wallplates, flooring, ceiling panels, and connecting fittings. (4) Detection of distortion, fatigue, rupture or the like in life-lines such as oil pipelines, oil storage tanks, gas pipelines, gas tanks, water pipelines, electric cables, and (maritime or underseas) communication cables. (5) Supervision for guarding against intruders into or protecting the environment of buildings, parks, and outside facilities. (6) Supervision of diastrophism and ground subsidence (for earthquake prediction). (7) Supervision or observation of living bodies. (8) Detection of liquid adhesion U.S. Pat. No. 7,136,156 discloses "a method, system, and medium . . . for Optical Time Domain Reflectometer (OTDR) Data storage and retrieval in a networking environment. The method includes receiving an OTDR trace file in its native format that includes OTDR information, storing the trace file, receiving a request to present the OTDR information in a browser or some other interface, identifying a viewer that can render the OTDR information, and communicating the OTDR information to the browser. The system includes a user interface that facilitates uploading an OTDR trace file in its native format, a storage device for receiving the trace file, and a viewer that can render the data within the OTDR trace file.

In optical fiber surveillance systems the resolution and the sensitivity of the surveillance system is limited in directions perpendicular to the length of the fiber.

SUMMARY

In accordance with an aspect of the disclosed technology, a fiber surveillance system includes an optical fiber, used, for example, in the detection of acoustic signals associated with vibrations or other activity. In one embodiment of the disclosed technology, the fiber is arranged in a two dimensional topology to improve the spatial resolution of the system. With such a topology the spatial monitoring resolution of the surveillance system is significantly improved over systems in which the fiber is deployed in an essentially straight line or linear, one-dimensional topology. In one embodiment of the disclosed technology, sections of two or more such two dimensionally arrayed fibers are oriented relative to each other at angles of approximately ninety degrees to produce a grid-like topology that results in even greater resolution.

In specific embodiments of the disclosed technology, the fiber is located underwater, for example on an ocean bed, either in extended regions of the body of water, such as in the middle of an ocean, or in coastal areas or ports. The fiber surveillance system may be used to detect any source of appropriate signals, such boats or humans on or in the water, and to monitor the location or movement of such sources of signals, including, for example, unauthorized activity. In alternative embodiments the disclosed technology may be used to detect motion in underground areas, such as mines, or may be used on the ground surface to detect surface traffic, such as on highways, railroad beds or airport runways. Additionally, such fibers may be located in the vicinity of security perimeters, perhaps both inside and outside the perimeter, to monitor unauthorized movement in and around a security perimeter, with a view, for example, toward monitoring unauthorized traffic that moves from outside the perimeter to inside the perimeter. In alternative embodiments, such fiber topologies may be used in a structure such as a building or in a vehicle such as an airplane to monitor for specific locations of, for example, a stress failure.

Since the location of a disturbance is measured by its distance along the fiber, and the exact topology of the fiber must be known to determine the geographic location of a disturbance that is a given distance along the fiber, a signal such as a vibration or other acoustic signal may be imposed at one or more known locations along the fiber to relate distance along the fiber to a specific geographic location.

Finally, a database of signatures associated with known conditions and/or disturbances in structures, bodies of water, on the ground surface, underground or in any appropriate environments, may be compared to a detected signal to help determine the nature of the source of the detected signal.

DETAILED DESCRIPTION

This detailed description of the disclosed technology will start with a general discussion of the disclosed topology. This discussion will be in the context of one application of that technology—the use of the technology to monitor airport runway traffic. Other aspects of the disclosed technology will be discussed in the context of this application including the use of a database of "signal signatures" that can be used to identify the type of aircraft being monitored, for example, in the absence of visual information, and the use of external acoustic sources to standardize, normalize or calibrate the system. Following that discussion, various other applications of the disclosed technology will be discussed. It will be understood by persons having ordinary skill in this art that any optical signal analysis technique useful in optical surveillance systems may be used with the disclosed technology. However, this Detailed Description will conclude with a discussion of an OTDR technology that may be used with the disclosed technology will be discussed.

The Disclosed Technology

Figure 1:
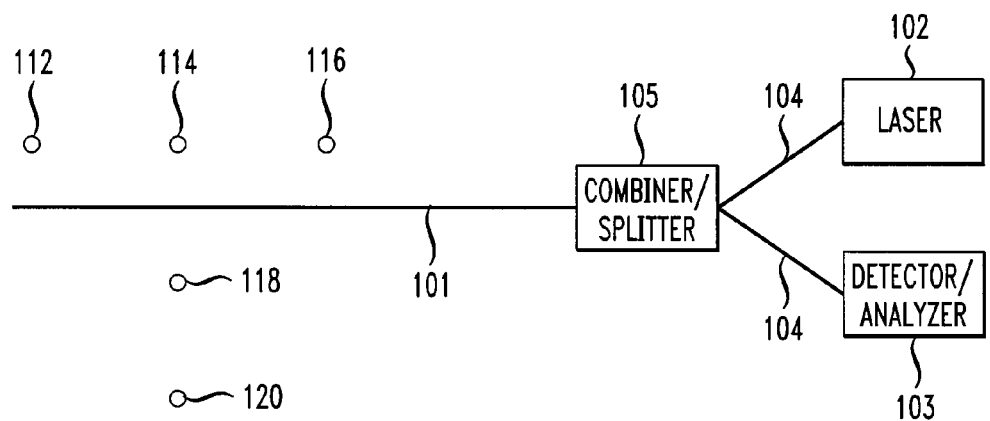
FIG. 1 is a schematic representation of a fiber topology for use in detecting an acoustic signal.

In one embodiment, the disclosed technology involves a fiber topology for detection of acoustic signals, such as those associated with surface vehicular or human traffic. Specific exemplary applications will be discussed below. The disclosed technology results in significantly improved spatial resolution for identification of the location, and perhaps other characteristics, of the source of the acoustic signal. FIG. 1 is a schematic representation of a prior art topology for use in detecting acoustic signals using fiber sensing technology. In this disclosure "fiber sensing technology" refers to any technology in which any signals, such as acoustic signals associated with vibrations, are detected based on the changes that such signals impose on an optical signal traveling in a fiber. These optical changes are then detected and analyzed to obtain information on the source of the acoustic signal including, for example, its location, structure and motion. In FIG. 1, 101 is an optical fiber, 102 is a laser or other source of optical energy, that is injected into the fiber, and 103 is, for example a semiconductor detector of optical energy emerging from the fiber as well as an analyzer, such as a digital signal processor, for processing the signal emerging from the fiber with a view toward characterizing the acoustic signal. In FIG. 1, 104 are sections of optical fiber section for bringing the optical energy from the source to the fiber, 101, and for bringing the optical energy emerging from the fiber to the detector and analyzer 103. 105 may be any appropriate optical combiner and/or splitter. In alternative embodiments the source of energy and/or the detector and analyzer may be connected directly to the fiber 101. It will be understood that the detector and analyzer of 103 may be two separated instrumentalities.

Various sources of acoustic signals are shown as 112, 114, 116, 118, and 120. These signals can be in the frequency range of between 20 Hz or 50 Hz on the low frequency side, and 20,000 Hz, 50,000 Hz or 100,000 Hz on the high frequency side. As will be understood by persons having ordinary skill in this art, if the optical technology used is for example, Optical Time Domain Reflectivity (OTDR), the fiber topology shown in FIG. 1 will enable the determination of, for example, the specific locations of the sources of signals numbered 112, 114 and 116, based on their distance along the fiber. However, this topology will not enable determination, with the same resolution, of the location of the sources 114, 118 and 120 since they occur approximately at the same lateral distance along the fiber.

Figure 2:
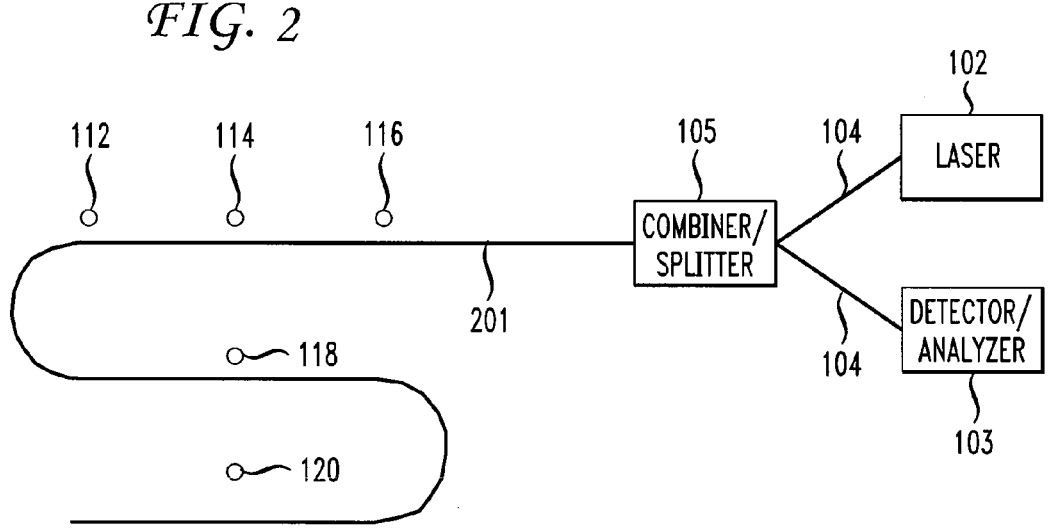
FIG. 2 is a schematic representation of a fiber topology involved in the disclosed technology.

One embodiment of the disclosed technology is shown in FIG. 2. In this figure, as in FIG. 1, 101 is an optical fiber, 102 is a source of optical energy that is injected into the fiber, and 103 is a detector of optical energy emerging from the fiber and an analyzer for processing the signal emerging from the fiber with a view toward characterizing the acoustic signal. 104 are optical fiber sections for bringing the optical energy to the fiber, 101, and for bringing the optical energy emerging from the fiber to the detector and analyzer 103. 105 is an appropriate optical splitter and/or combiner. In the embodiment of FIG. 2, the fiber is shown as having a two dimensional, curved topology, rather than the one dimensional, linear topology of the fiber shown in FIG. 1. In FIG. 2 the fiber meanders or serpentines over a two dimensional surface. Accordingly, in this FIG. 2, sources 114, 118 and 120 occur at different distances along the fiber and, therefore, in one advantage of the disclosed technology, their spatial location can be resolved with much greater accuracy than with the topology shown in FIG. 1.

Figure 3:
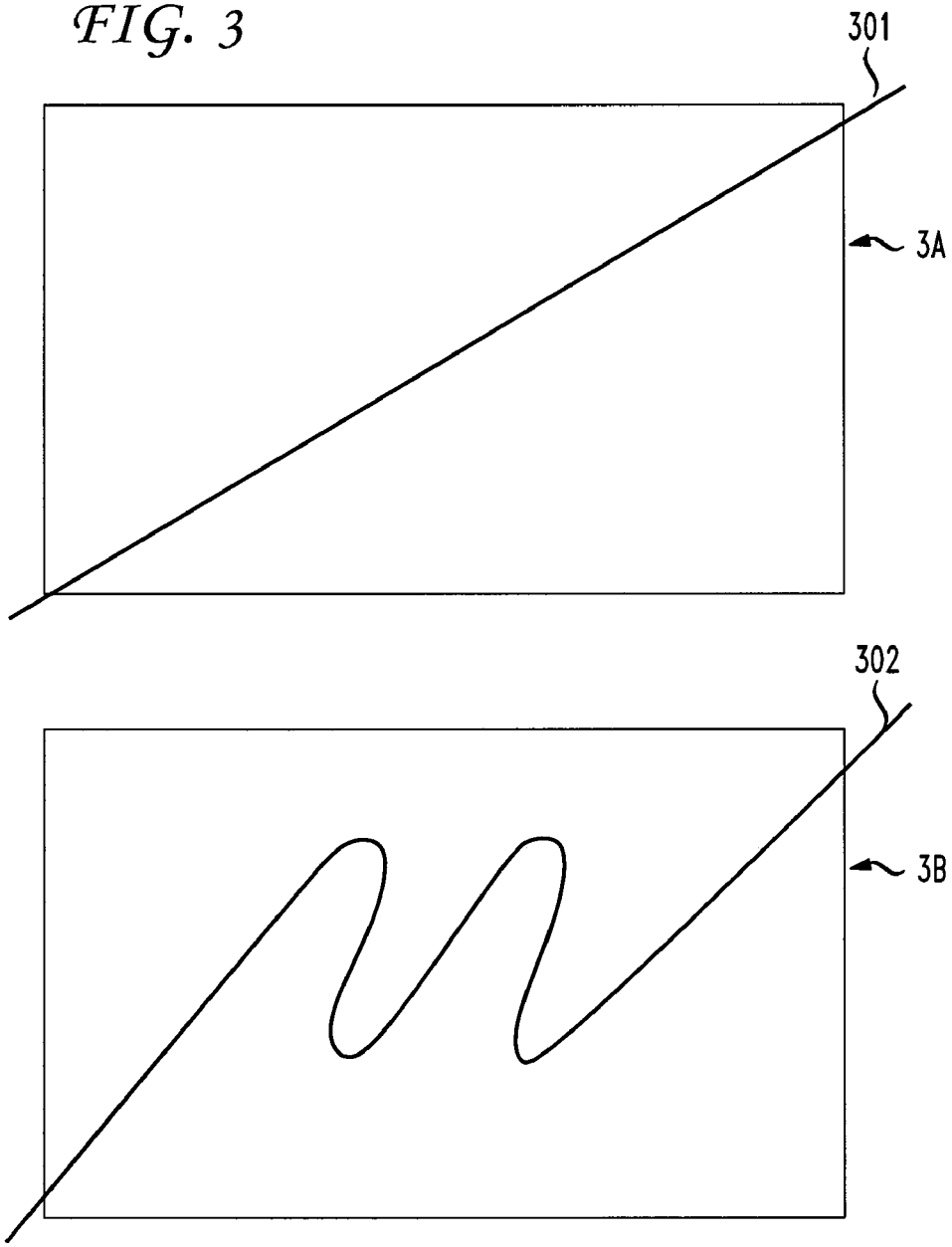
FIGS. 3A and 3B are schematic representations that may be used in one definition of the disclosed fiber topology.

In FIG. 3 the fiber topology of the disclosed technology is characterized in greater detail. In the disclosed technology the fiber is oriented in a two dimensional topology rather than in a one dimensional topology. This two dimensional topology results in greater fiber coverage of a given area than when the fiber is oriented in single dimensional topology. In FIG. 3, 3A and 3B are equal areas over which fibers 301 and 302 are oriented. Fiber 301 is oriented in a single dimensional (i.e., essentially straight line) topology, while fiber 302 is oriented in a two dimensional, curved topology in accordance with the disclosed technology. It will be understood that in the single dimensional topology of 301, the greatest length of fiber that can be oriented in the two dimensional area 3A is equal to the largest diagonal associated with the area. However, in the two dimensional fiber topology 302 of the disclosed technology, a greater length of fiber can be oriented in the same two dimensional area. Accordingly, in one embodiment of the disclosed technology, the length of fiber oriented in a given two dimensional area is greater than the largest diagonal associated with the given two dimensional area. In alternative embodiments, the length of fiber oriented in a given two dimensional area is 10%, 20% or 50% greater than the largest diagonal associated with the two dimensional area.

Figure 4:
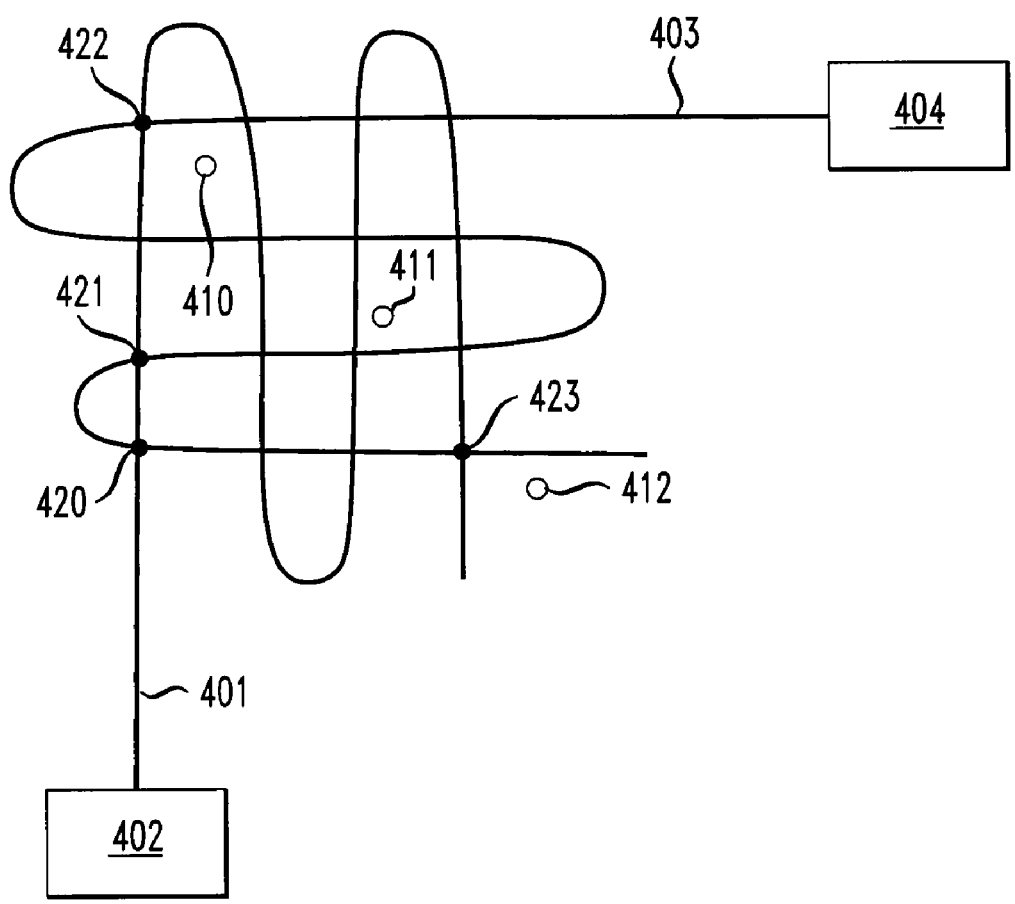
FIG. 4 is an alternative embodiment of the disclosed fiber topology.

Another embodiment of the invention is shown in FIG. 4. In this FIGURE there are two fibers, 401 and 403, each of which is oriented in a two dimensional topology with the two fibers at least partially overlapping each other. Each of these fibers may have its own source of optical energy, detector and associated instrumentation, 402 and 404, as shown, for example, in FIG. 2. Alternatively there may be one set of instrumentation which services both fibers.

In FIGS. 4, 420, 421, 422 and 423 are four of the sixteen points where the two fibers overlap. In alternative embodiments the fibers overlap at more than 1, 2, 4, 10 or more points. It will be understood that any degree of overlap will result in a resolution improvement. However in alternative embodiments, portions of more than 10% 20% or 50% of the fiber length will have overlapping points. In FIG. 4, fiber 401 has overlapping points between 420 and 423. The lengths of the fibers from 420 to 423 are the portions of the fiber having overlapping points. That portion is greater, for example, than 10% of the total fiber length. While this discussion has been in terms of two fibers, it will be understood that any number of fibers may be used to further improve the resolution of the system.

In FIGS. 4, 410, 411 and 412 are sources of vibration or other disturbance that results in an optical signal that may be detected and analyzed at 402 and 404. The dual fiber topology of FIG. 4 will enable the determination of the spatial location of the various disturbances with much greater resolution because of the two dimensional nature of the topology of each fiber and the overlapping nature of the orientation of the fibers.

Many fiber surveillance technologies determine the location of the disturbance based only on the distance along the fiber of the detected disturbance. This determination is most often made by measuring signal strength as a function of distance along the fiber, as measured for example by delay between the time that the source optical signal is injected into the fiber and the time that the reflected signal is detected. However, since in the disclosed technology the orientation of the fiber is two dimensional rather than one dimensional, the exact geographic location of any point along the fiber may not be known. Accordingly, the geographic location of a disturbance may not be determinable simply based on the distance along the fiber where the disturbance is located. Therefore, it would be advantageous to know the geographic location of points along the fiber as a function of its distance of the points along the fiber. The geographic location of points along the fiber can be determined by imposing a vibration or other acoustic signal at known points along the fiber. In this way the geographic location of the fiber can be mapped and the distance along the fiber can be associated with a specific geographic location. Such characterization of the fiber location can be accomplished by using, for example, well known crystal controlled vibrating rods. As the rod is moved relative to the fiber, both along the fiber and perpendicular to it, the signal will be maximum when the rod is exactly over the fiber. In this way the fiber may be calibrated to determine the exact geographic location of any point along the fiber.

Figure 8:
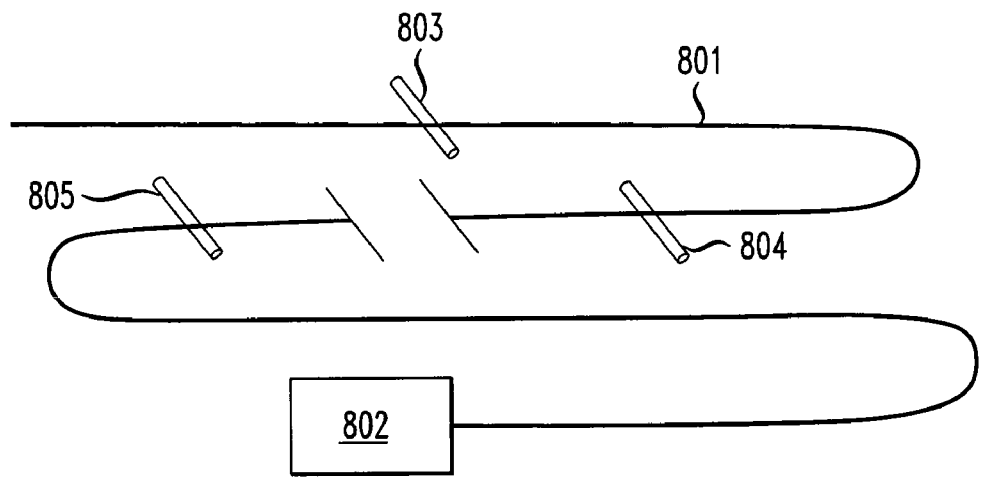
FIG. 8 is an alternative embodiment of the disclosed technology.

A known source of external disturbance can also be used to easily determine the location of a break in the fiber. In accordance with this technique an external source of disturbance is passed along a fiber as shown in FIG. 8. In this FIG. 801 is an optical fiber that may be part of an optical communication system. The fiber may be buried underground. If the fiber fails to operate because of a break, 803, it can be very expensive to locate the break in order to fix the fiber. In accordance with one aspect of the disclosed technology, the fiber break can be located by attaching appropriate signal generating and detecting instrumentalities to the fiber at 802. A source of acoustic disturbance such as a rod that vibrates at acoustic frequencies can then be passed above ground in the vicinity of the fiber. Various positions of the vibrating rod are represented by 805, 804, and 803. It will be understood that for positions 811 and 812 no return signal will be detected because of the break in the fiber. However, when the vibrating rod is at position 813 a return signal will be detected. The location of the break can then be localized to between location 812 and 813. In order to determine the break location more accurately positions 812 and 813 can be brought ever closer. It will be understood that this technique for locating breaks in a fiber can be used for fibers that are arranged in a one dimensional topology as well as for those arranged in a two dimensional topology.

In accordance with the disclosed technology, not only can the location of a disturbance be determined, but if the source of the disturbance moves, its location can be determined at different times. Accordingly the path of travel and the velocity of motion, as well as other characteristics of the motion, can be determined. In alternative embodiments of the invention, this information can be used to provide advanced warning not only of unauthorized activity, but of impending collisions between moving objects or between a moving a stationary objects. The fibers may be situated adjacent to the stationary object, i.e., sufficiently close to provide time warnings.

Figure 5:
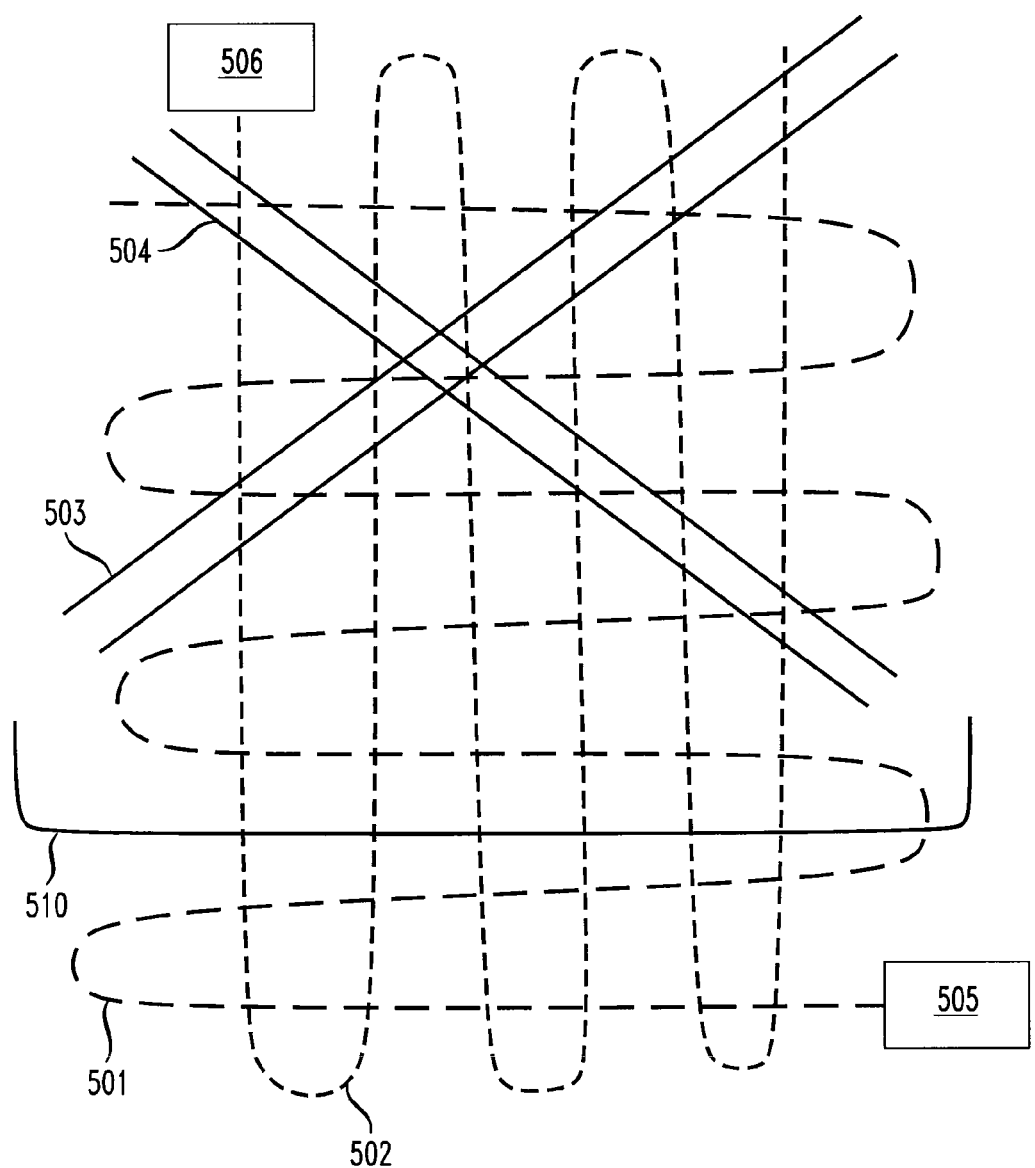
FIG. 5 is a schematic representation of an application of the disclosed technology involving monitoring ground traffic.

The optical signals generated by different disturbances will have characteristics unique to the particular disturbance. For example the optical signal may vary depending on the weight of the source of the disturbance as well as on any motion associated with the disturbance. Similarly, any acoustic output associated with the source will also affect the signal. For example, there will a unique signal associated with the stroke of swimmers. Additionally, unique signatures may be associated with the vibration or acoustic signals caused by the continuous operation, starting, or stopping of an engine, with diving or swimming equipment, such as moving flippers or breathing equipment, with waves lapping against a boat, with noise associated with ocean wave action, or with movements associated with ground or underwater erosion, or even a tsunami event. In structures, the motions associated with stresses can be monitored over time and signatures associated with safe as opposed to dangerous levels of stress or material fatigue can be collected. These signatures can be based on acoustic frequency, phase and/or amplitude parameters or other parameters, some of which may vary with time. Such known signatures can be measured and stored, and then compared with the signal from an unknown source to determine the nature of the unknown source or with the historical behavior of the signature of a give source to analyze its historical characteristics. Such analysis can be accomplished using for example well known digital signal processing techniques. These techniques can be combined with the increased spatial resolution enabled by the disclosed fiber topology to yield a much more effective and powerful surveillance methodology Applications of the Presently Disclosed Technology The presently disclosed technology can be used in, for example, surface, subterranean and underwater applications. FIG. 5 is a schematic diagram of a generic embodiment of the disclosed technology. In this figure, the dotted lines 501 and 502 are two overlapping fibers arranged in a two dimensional topology in accordance with the disclosed technology. The fibers will have associated instrumentalities 505 and 506 for injecting optical signals into the fibers and detecting return signals that are characterized depending on the type of optical scattering technology being used such as Rayleigh scattering and/or OTDR. In this FIGS. 503 and 504 are paths along which vehicular or human traffic may pass. Accordingly, 503 and 504 may be runways or taxiways at an airport, railroad tracks, highways, or subterranean passages, such as in mines, or even traffic routes in a body of water. Based on the disclosed technology, traffic on the paths 503 and 504 may be detected with increased spatial resolution. Accordingly, such traffic may be guided by, for example, airport or railroad controllers to monitor traffic, direct traffic and/or avoid collisions between vehicles or between a vehicle and a stationary object. For example, the technology may be used to avoid collisions between planes on taxiways, boats in fog, or boats and bridges or other stationary objects. In the subterranean application, the technology may also be used to determine the location of trapped miners. As discussed above, the disclosed technology may be used to determine direction of travel of the source of the signal as well as velocity and acceleration of the source. Additionally the nature of the source may be determined by comparing the signature of the detected signal with a stored database of known signals. The traffic location and motion parameters may be displayed on a screen to produce a visible representation of the traffic for further ease of control. When used at airport locations, the detection capability may be extended to include airplane approach areas where, even though the plane has not landed, the engines provide sufficient acoustic energy to be detected by underground or surface fiber deployed in accordance with the disclosed technology. As disclosed, the fiber surveillance system of the disclosed technology may be calibrated using an appropriate source or sources of acoustic energy In FIG. 5, 510 represents a perimeter of the area. The surveillance system may be used to determine unauthorized movement inside the perimeter, outside the perimeter, or from outside the perimeter to inside the perimeter. This technology may be used to establish security perimeters around structures or designated land or water areas, such as coastal areas and critical water based structures such as off-shore oil drilling facilities, nuclear power plants, etc. When applied in bodies of water the disclosed technology can be used to detect not only human and vehicular traffic on or below the water surface, but may also be used to monitor tsunamis, fish migration and other water based events that have acoustic or vibration signals associated with them. Both on-water and underwater activity can be detected.

Figure 6:
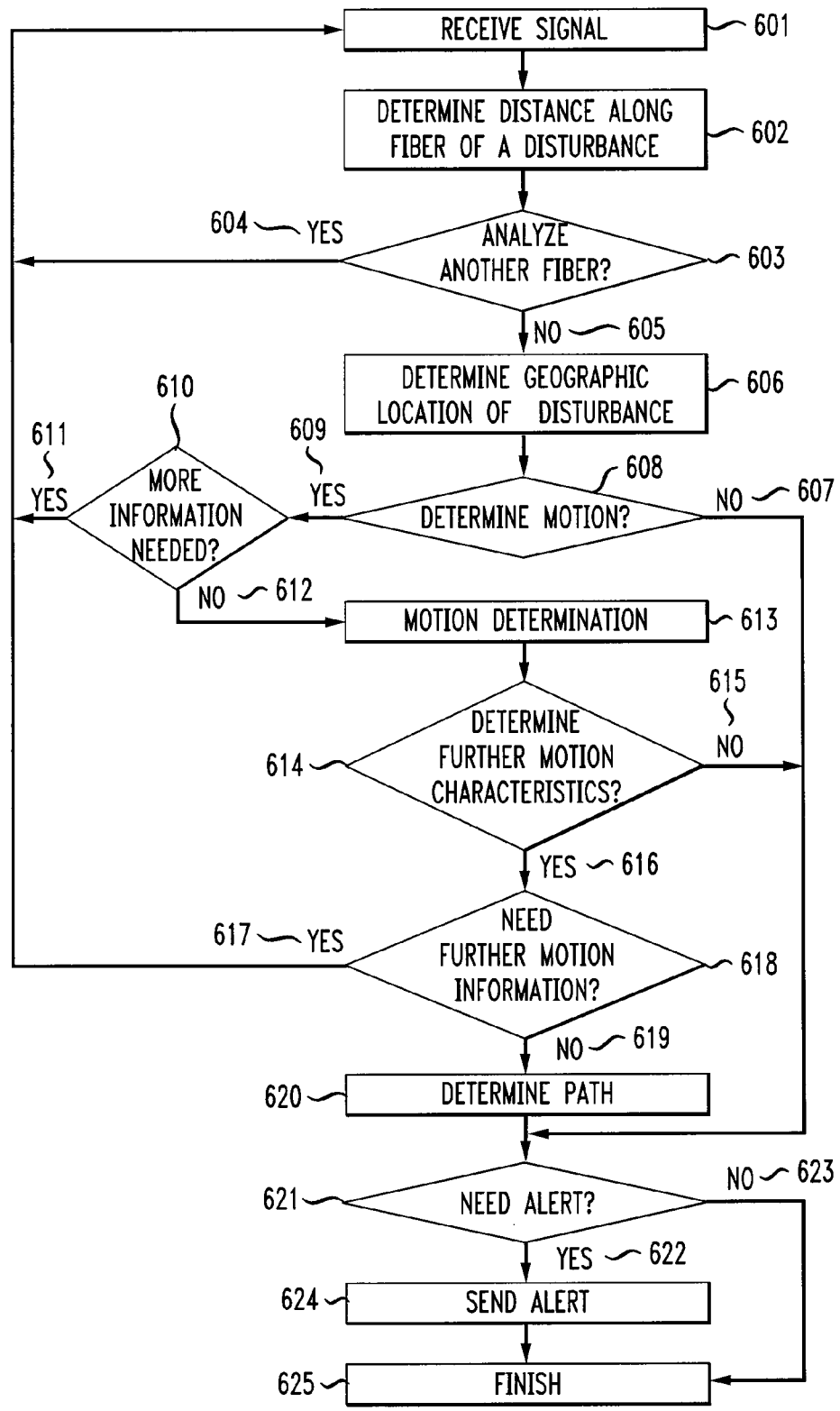
FIG. 6 is a schematic representation of an exemplary methodology used in one embodiment of the disclosed technology.

A generic methodology for use with the disclosed technology is shown in FIG. 6. In this Figure, at 601 a return signal is received from a fiber that is positioned in accordance with the disclosed technology. The return signal may be associated with on any appropriate fiber surveillance scattering technology, such as Raleigh scattering or OTDR. At 602, the location, along the fiber, of the disturbance associated with the return signal, is determined, perhaps based on previous calibration using known vibration sources. At 603 it is determined if there is another fiber associated with the surveillance system. If there is such other fiber, the method continues at 604, and a signal associated with the second fiber is received at 601 and the location, along the second fiber, of the disturbance associated with the second return signal is determined at 602. This loop continues until all fibers in the system have been monitored. Of course, it will be understood that, in alternative embodiments, the method need not analyze the return signal from every fiber in the system. In any event, at 605 if no further fibers are to be monitored for received signals the method proceeds to 606 where the various locations along the fiber that have been determined at 602 are correlated with each other, and perhaps with calibration information discussed above, to determine the geographic location of the disturbance.

At 608 it is determined if motion characteristics of the disturbance are desired. If at 609 such motion characteristics are desired, then at 610 it is determined if more information is needed to determine such motion characteristics. If more information is needed then at 611 the analysis loop is repeated and the various measurements are made again at a second time. This loop is repeated until at 612 it is determined that no further information is needed for motion analysis. The motion characteristics of the disturbance are then determined at 613 based on the measurements associated with the different times. If motion characteristics of the disturbance are not necessary, then the method proceeds at 607.

At 614 it is determined if further motion characteristics of the disturbance, such as the path, are desired. If such characteristics are not desired then the methodology proceeds at 615. If at 616 it is determined that further motion characteristics of the disturbance, such as the path, are desired then at if 618 it is determined if further information, such as the location of the disturbance at a third time, is necessary to obtain such further motion characteristics. If at 619 no further measurements are necessary then the methodology proceeds to 619. If at 617 such further information is needed, then, the methodology proceeds to obtain more information, for example, at different times, until at 619 no further measurements are necessary. At 620 further motion characteristics, such as the path of the disturbance are then determined.

If at 607 it is determined that motion characteristics are not desired, or if at 616 it is determined that no further motion characteristics are desired, then it is determined at 621 if an alert is necessary, for example, based on the location, motion or path data, because of, for example, unauthorized or suspicious activity, or an impending collision. If at 623 it is determined that an alert is not necessary then the method proceeds to a finish at 620. However, if at 622 it is determined that an alert is necessary, then at 624 an alert, and/or any further appropriate action is performed or initiated and the process finishes at 625. The alert may, for example, take the form of a communication to appropriate authorities or can be a local visual or audible alert.

Figure 7:
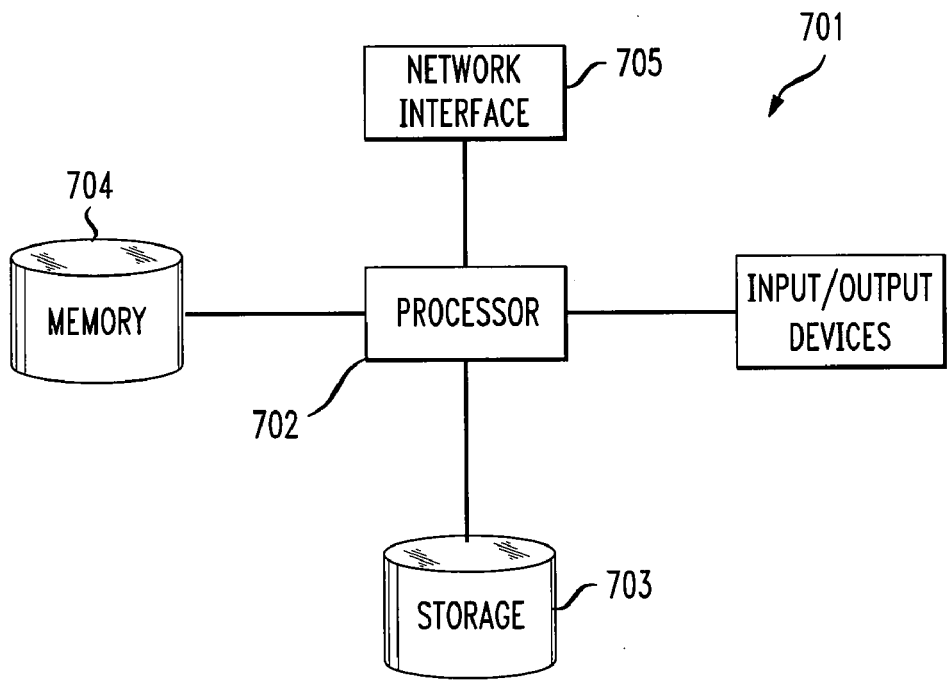
FIG. 7 is a schematic representation of a computer that may be used in implementing methodologies of the disclosed technology.

A high-level block diagram of a computer that may be used to implement the methodology of FIG. 6 is illustrated in FIG. 7. Computer 701 contains a processor 702 which controls the overall operation of the computer 701 by executing computer program instructions which define such operation and implement the methodology of FIG. 6. The computer program instructions may be stored in a storage device 703, or other computer readable medium (e.g., magnetic disk, CD ROM, etc.), and loaded into memory 704 when execution of the computer program instructions is desired. Thus, the method steps of FIG. 6 can be defined by the computer program instructions stored in the memory 704 and/or storage 703 and controlled by the processor 702 executing the computer program instructions. For example, the computer program instructions can be implemented as computer executable code programmed by one skilled in the art to perform an algorithm defined by the method steps of FIG. 6. Accordingly, by executing the computer program instructions, the processor 702 executes an algorithm defined by the method steps of FIG. 6. The computer 701 also includes one or more network interfaces 705 for communicating with other devices via a network. The computer 701 also includes input/output devices 706 (e.g., display, keyboard, mouse, speakers, buttons, etc.) that enable user interaction with the computer 701. One skilled in the art will recognize that an implementation of an actual computer could contain other components as well, and that FIG. 7 is a high level representation of some of the components of such a computer for illustrative purposes Exemplary Optical Phenomenon for Use With the Presently Disclosed Technology Technologies such as those disclosed in references discussed in the BACKGROUND section of this disclosure may be applied to the technology disclosed in this specification. Accordingly, some of the disclosure from those Publications will be quoted here to give this specification an exemplary context. However, it will understood by those having ordinary skill in the art that the technology disclosed in this specification can be implemented with any appropriate optical scattering technique, including but not limited to Raleigh scattering and OTDR.

The technology disclosed in the Patent Application Publications referenced above involve, in one embodiment, launching optical pulses into a buried optical fiber and detecting the signal backscattered by the fiber. The optical frequency of one pulse within a pair of pulses differs slightly from the optical frequency of the other pulse within the pair of pulses. This frequency difference (or separation) itself varies from one pair of pulses to the next. This variation in frequency difference results in a detected backscattered signal having a phase that is modulated by an acoustic signal in the vicinity of the fiber, allowing decoding of the disturbance with improved signal to noise ratio, reduced fading and a linear output. (In the present disclosed technology, as well as in the technology disclosed in the referenced Patent Publications, the following definitions apply: The pulses may be considered as individual pulses, pairs of pulses or groups of pulses; The term "launching" includes introducing the pulse into the fiber or transmitting the pulse in the fiber; The term "optical" as used herein may refer to the region of the electromagnetic spectrum that is visible, generally considered to be between approximately 380 nm. and 760 nm. However, depending on the application, the term "optical" as used herein can extend into what is sometimes referred to as the infrared and ultraviolet range of the spectrum, for example from 200 nm. to 5,000 nm, or nm. to 100,000 nm. In any event, the term "optical" will apply to any frequency which is used to transmit data or voice in or through optical fibers; and While the discussion is in terms of an optical fiber, in alternative embodiments pulses outside the optical spectrum may be launched into any appropriate medium that will transmit the pulses.)

In a specific embodiment disclosed in those Patent Publications, where the pulses are 20 meters wide, the frequency difference is on the order of 5 MHz and varies by about 5 MHz from one pulse pair to the next. In alternative embodiments the frequency difference can range from approximately 1 MHz. to approximately 5 MHz. For these parameters, each pulse pair results in independent scattering, yielding improved signal to noise ratio. These parameters also result in a relative phase shift of the interference between pulses within each pulse pair of the order of Pi, yielding reduced fading if multiple pulse pairs are used. (Note that it is possible to detect the scattering of each pulse pair from the same section of fiber to within the spatial width of the pulse.)

Both the amplitude and the phase of the beat signal are affected by acoustic disturbances that may be present in the vicinity of the fiber. In one embodiment, the amplitude and phase is extracted from the scattered signal using known complex demodulation techniques. Demodulation is performed at the known frequency difference between pulses in a pair. Such demodulation may be performed by multiplying the reflected signal at the difference frequency by the sine and cosine of the difference frequency. This results in both sinusoidal components and a DC component. For a specific embodiment, a low pass filter with cut-off frequency in the vicinity of 5 MHz isolates the DC component. (Note that if this low pass filter is too narrow it will blur the spatial resolution of the result and if it is too broad it will include the results from the next pair of pulses that may be separated by about 10 MHz. yielding a result that is not independent.) The DC component reflects the phase and amplitude of the scattered signal. Rectangular to polar conversion enables the independent determination of the phase and amplitude. The phase will drift relative to the local demodulating signal because of small, slow-varying, changes in environmental parameters. Accordingly, to remove this drift, a high pass filter is used on the phase signal after the rectangular to polar conversion. In this way only the acoustic signal is observed. Detection techniques that only measure the amplitude suffer from low signal to noise ratio, fading and nonlinearity. The present invention, by using pulse pairs with appropriate frequency spacing and by analyzing the phase of the scattered beat signal, results in improved signal to noise ratio, reduced fading and an output that is linear over a larger dynamic range.

The discussion to this point has focused on a single pulse pair that is transmitted through the fiber. If, for this single pulse pair, we want to look at every 20 meters of fiber, we sample accordingly in time, knowing the time of launch. In analyzing the results, N analysis "bins" may be used, one bin for each 20 meter section of fiber. When multiple pulse pairs are used at some pulse repetition rate then for each bin data will arrive at the pulse repetition rate. A filter is applied to limit the signal to the acoustic band of interest—usually between 1 Hz and 200 Hz for acoustic coupling through the ground. A low pulse repetition frequency limits the maximum acoustic frequency that can be detected without aliasing. A given frequency difference can not be reused in a second pulse pair until we have observed all of the backscattering from that frequency difference. Accordingly, a given frequency difference can not be reused until the round trip time within the cable passes. A 2.5 kHz pulse repetition rate is compatible with a cable length of about 25 miles.

There is still an amplitude variation in the observed signal and if the amplitude gets too low the signal to noise ratio is poor. In those circumstances, the low amplitude result may be disregarded or given low weight. Additionally, a phase unwrap algorithm may be used to obtain greater dynamic range. Because of the discontinuity in arctan as the phase exceeds the range −Pi to +Pi, it is advantageous to add the results at the discontinuity to remove that artifact. If there is no acoustic disturbance there is no change in the phase and amplitude. If there is an acoustic disturbance, it results in very small local changes in fiber length and a linear change in the phase reflecting linear strain in the fiber.

The duty cycle may be improved by launching pulse pairs with different frequency deltas for the various pulse pairs. In this way multiple pairs may be propagated in the fiber at one time and their signals can be differentiated by observing the appropriate deltas. The analysis for a second pulse pair is the same as that described above for the first pulse pair except that the demodulating frequency is the new delta. After the high pass filtered phase result is obtained, it is combined with the appropriate bin from the previous pulse—using a time shift reflecting the time difference between the first and second pulse pair. The resultant acoustic signals will add coherently—that is, if the acoustic signal is varying, the detected variation between the first and second pulse pairs will be in phase and add constructively resulting in improved signal to noise ratio. Additionally, if one of the results for the first pulse pair is faded or has low amplitude, the results for the second pulse pair is highly unlikely to show similar effects because of the pi shift in the deltas.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An optical fiber surveillance system, comprising:
a first optical fiber arranged in a two dimensional topology associated with a two dimensional surface;
a source of optical energy configured to inject the optical energy into the first optical fiber;
an optical detector configured to detect a return optical signal, the return optical signal associated with an acoustic signal impinging on the first optical fiber; and
an analyzer for determining based on characteristics of the return optical signal, a cause of the acoustic signal and a spatial location within the two dimensional surface of the acoustic signal, the analyzer comprising:
a computer readable database comprising backscattered optical signals associated with known sources of acoustic signals impinging on a fiber; and
a processor for comparing the return optical signal to the backscattered optical signals.

2. The system of claim 1 further comprising a second optical fiber arranged in a two dimensional topology and overlapping the first optical fiber.

3. The system of claim 2 wherein the first and second optical fibers are located on an underwater bed of a body of water.

4. The system of claim 3 wherein the first and second optical fibers are located in a coastal area.

5. The system of claim 4 wherein the body of water is a port.

6. The system of claim 5 wherein the first and second fibers are located adjacent to a permanent structure.

7. The system of claim 2 wherein the first and second fibers are in an underground cave.

8. The system of claim 2 wherein the first and second fibers are adjacent to a railroad track.

9. The system of claim 8 wherein the first and second fibers are adjacent to an intersection of the railroad track and another vehicular pathway.

10. The system of claim 8 wherein the first and second fibers are adjacent to an intersection of two railroad tracks.

11. The system of claim 1 wherein the first optical fiber is located within a security perimeter and a second optical fiber is located outside the security perimeter.

12. A method for determining a cause and a spatial location of a source of acoustic energy comprising:
receiving, from a fiber arranged in a two dimensional topology, an optical signal associated with the acoustic energy, the two dimensional topology associated with a two dimensional surface; and
analyzing the optical signal received to determine the cause and the spatial location of an acoustic signal, wherein analyzing the optical signal comprises:
accessing a computer readable database comprising backscattered optical signals associated with known sources of acoustic signals impinging on a fiber; and
comparing the optical signal received to the backscattered optical signals.

13. A method for determining a cause and a spatial location of a source of acoustic energy comprising:
receiving, from each of a plurality of fibers arranged in a two dimensional topology, an optical signal associated with the acoustic energy, the two dimensional topology associated with a two dimensional surface; and
analyzing optical signals received to determine the spatial location of an acoustic signal, wherein analyzing the optical signal comprises:

accessing a computer readable database comprising backscattered optical signals associated with known sources of acoustic signals impinging on a fiber; and comparing the optical signal received to the backscattered optical signals.

14. The system of claim 7 wherein the underground cave is a mine.

15. The method of claim 13 where at least two of the plurality of fibers are overlapping.

16. The method of claim 12 wherein the length of the fiber oriented in a given two dimensional area is greater than a largest diagonal associated with the given two dimensional area.

17. The method of claim 13 wherein the length of each of at least two of the plurality of fibers, when oriented in a given two dimensional area, is greater than a largest diagonal associated with the given two dimensional area.

18. The system of claim 1 wherein the length of the first optical fiber oriented in a given two dimensional area is greater than a largest diagonal associated with the given two dimensional area.

* * * * *